US006357560B1

(12) United States Patent
Miller et al.

(10) Patent No.: US 6,357,560 B1
(45) Date of Patent: Mar. 19, 2002

(54) SERVO ASSEMBLY FOR OPERATING A BRAKE BAND IN AN AUTOMATIC TRANSMISSION VEHICLE

(75) Inventors: Jean Marie Miller, Plymouth; Robert Cary Haase, Southfield; Felicia Paluzzi, Grosse Pointe Woods, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/531,186

(22) Filed: Mar. 21, 2000

(51) Int. Cl.⁷ .................................................. F16D 51/00
(52) U.S. Cl. ............................ 188/77 W; 91/29; 91/32
(58) Field of Search ........................ 188/77 W, 77 R; 91/28, 29, 32; 92/130 R

(56) References Cited

U.S. PATENT DOCUMENTS

| | | | | | |
|---|---|---|---|---|---|
| 2,782,598 A | * | 2/1957 | Gatwood | ..................... | 60/468 |
| 3,968,729 A | * | 7/1976 | Hansen et al. | ................... | 91/32 |
| 3,999,462 A | * | 12/1976 | Chamberlain | ................... | 91/29 |
| 4,059,042 A | * | 11/1977 | Bridwell et al. | ............... | 91/469 |
| 4,089,171 A | * | 5/1978 | Hubbard | ....................... | 60/486 |
| 4,111,283 A | * | 9/1978 | Hastings, Jr. | ................ | 187/9 R |
| 5,131,227 A | * | 7/1992 | Iseman | ......................... | 60/422 |
| 5,511,639 A | * | 4/1996 | Sherman | .................... | 188/77 R |
| 5,711,403 A | | 1/1998 | Sparks et al. | | |
| 5,881,858 A | * | 3/1999 | Tsukamoto et al. | ............ | 192/86 |

FOREIGN PATENT DOCUMENTS

JP         402173470 A   *  7/1990

* cited by examiner

*Primary Examiner*—Christopher P. Schwartz
*Assistant Examiner*—Xuan Lan Nguyen
(74) *Attorney, Agent, or Firm*—Ford Global Technologies, Inc.

(57) ABSTRACT

A servo assembly 22 for selectively engaging a brake band 14 in an automotive vehicle is disclosed. Servo assembly 22 includes a piston 26 at least partially encased in a housing 24 and a first and second supply 111, 132 of hydraulic fluid which selectively actuate the piston to engage the brake band.

20 Claims, 4 Drawing Sheets

SERVO ASSEMBLY FOR OPERATING A BRAKE BAND IN AN AUTOMATIC TRANSMISSION VEHICLE

FIELD OF INVENTION

The present invention relates to the field of automatic transmission control for automotive vehicles and more particularly, to the hydraulic actuation of a brake band that holds a component of a gearset against rotation.

BACKGROUND OF THE INVENTION

Vehicles having automatic transmissions have conventionally utilized a servo mechanism and/or assembly to selectively actuate a piston within a piston chamber such that the piston selectively engages a brake band in the transmission to effect a change of gears in the vehicle. The piston is typically comprised of a rod or cylindrical portion which is mounted and/or attached to a seal portion. The servo mechanism conventionally distributes and/or expels hydraulic fluid into the piston chamber and/or housing such that the hydraulic fluid places pressure upon the seal portion of the piston, thereby actuating and/or forcing the cylindrical portion and/or rod of the piston into engagement with the brake band or into engagement with an assembly that engages the brake band. The actuating force applied to the piston by the hydraulic fluid is proportional to the amount of surface area of the seal portion which is exposed to and/or contacted by the fluid. Because it is desirable to have the piston apply different forces to the brake band during different gear shifts, piston and piston chamber arrangements have been created whereby two different portions of the surface area of the piston sealing portion are selectively exposed to a single source and/or supply of hydraulic fluid pressure. Such an arrangement is disclosed in U.S. Pat. No. 5,711,403 of which is assigned to the present assignee and which is herein incorporated by reference. These arrangements, however, present drawbacks.

In particular, when only a single source of hydraulic fluid pressure is exposed to two different portions of the surface area of the piston sealing portion, only two different forces can be applied to the piston and thereby applied to the brake band (and therefore only two different forces are available for any particular gear change). For example, and without limitation, only two forces are available for gear shifts to and/or from park, drive, reverse and the lower gears. Furthermore, the forces applied are controlled strictly by the single source of fluid pressure. Therefore, the single source of fluid pressure must be calibrated to within a very small margin of error so that the forces of the hydraulic pressure do not widely vary and cause awkward, slow and/or noisy gear shifts. For example, and without limitation, shifting into reverse requires a much greater force to be applied to the piston than downshifting into lower gears. Consequently, if a single pressure source and/or supply is used, an excessive amount of pressure will likely be used to assure enough force is present to smoothly shift into reverse gear. However, when only a single source of fluid pressure is utilized, that amount of pressure may be too large for shifts into lower gears even though the source is applied to a different surface area of the piston. Particularly, the excessive pressure will cause those down shifts to have poor shift "feel".

In view of these drawbacks, it is desirable to provide a servo assembly and/or mechanism that has the capability of allowing a wider margin of error in hydraulic fluid pressure calibration and which allows hydraulic fluid to be applied to the piston from two independent supplies or sources.

SUMMARY OF THE INVENTION

It is a first object of the present invention to provide a servo assembly to selectively engage a brake band which overcomes the various previously delineated drawbacks of conventional servo assemblies.

It is a second object of the present invention to provide a servo assembly which provides for more effective calibration and/or control over the forces used to actuate a brake band.

According to a first aspect of the present invention, a servo assembly for engaging a brake band in a vehicle having an automatic transmission is provided. The servo assembly includes a piston which selectively engages the brake band, the piston including a first portion and a second portion; a housing having an interior area, the housing at least partially surrounding the piston; an interior member which extends from the housing into the interior area of the housing thereby separating the interior area into a first area and a second area; a first supply which supplies a first amount of hydraulic fluid through a first opening in the housing to the first area wherein the first amount of fluid applies a first pressure to the first portion of the piston; and a second supply which supplies a second amount of hydraulic fluid through a second opening in the housing to the second area wherein the second amount of fluid applies a second pressure to the second portion of the piston.

According to a second aspect of the present invention, a servo assembly for selectively actuating a piston which engages a brake band is disclosed. The servo assembly includes a first supply of hydraulic fluid which supplies a first amount of hydraulic fluid to a first portion of the piston thereby applying a first pressure against the first portion; and a second supply of hydraulic fluid which supplies a second amount of hydraulic fluid to a second portion of the piston thereby applying a second pressure against the second portion; wherein the first pressure is controlled separately from the second pressure.

According to a third aspect of the invention, a method for actuating a piston within a servo assembly is provided. The method includes providing a first supply of hydraulic fluid which selectively places a first pressure upon a first portion of the piston; providing a second supply of hydraulic fluid which selectively places a second pressure upon a second portion of the piston.

These and other objects, aspects, and advantages of the present invention will become apparent upon reading the following detailed description in combination with the accompanying drawings.

DETAILED DESCRIPTION OF THE PREFERRED EMBODIMENT OF THE INVENTION

Figure 1:
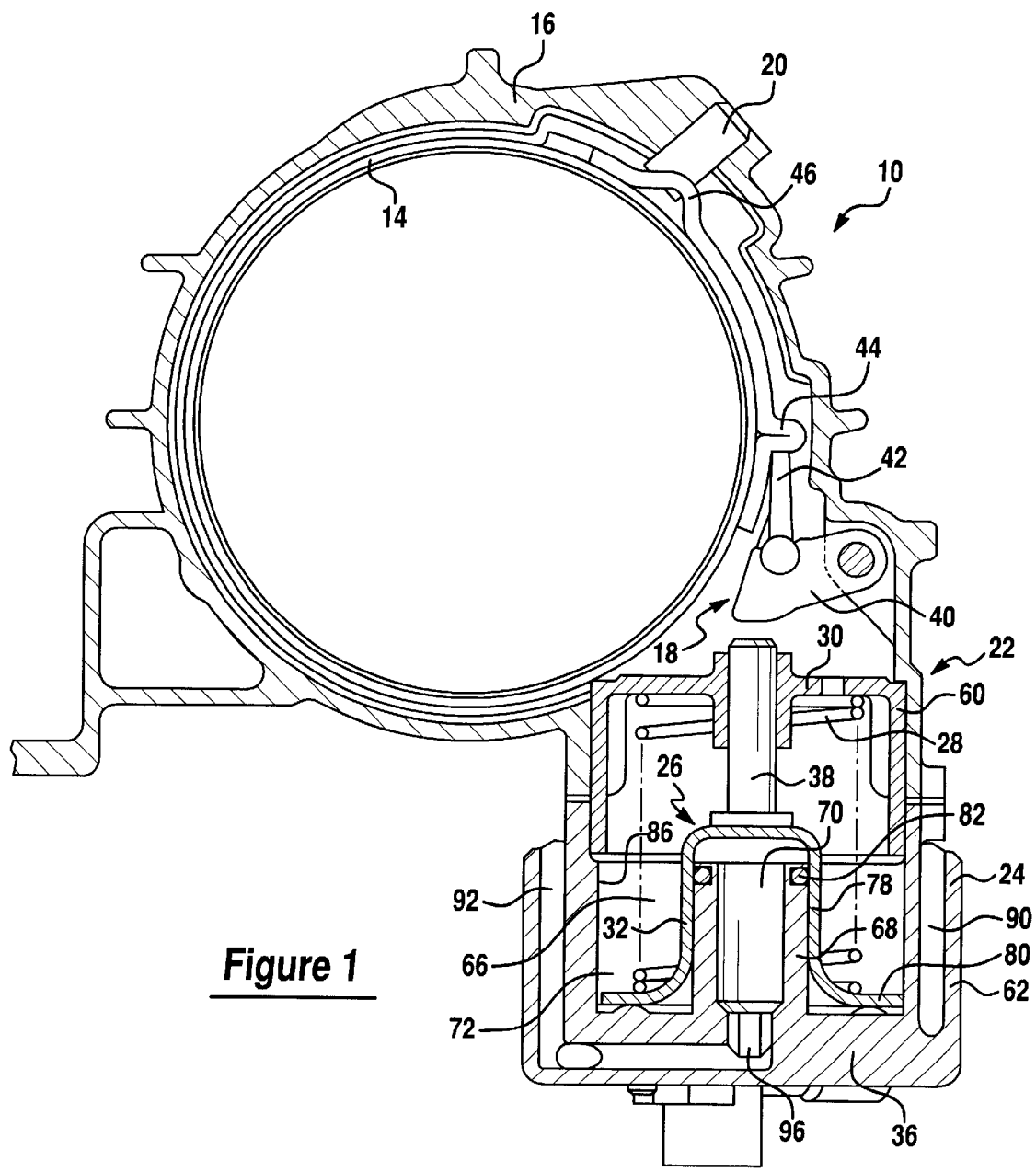
FIG. 1 illustrates sectional side view of a brake band assembly and a servo assembly according to a preferred embodiment of the present invention.

Referring now to FIG. 1, there is shown a brake band assembly 10. In the non-limiting embodiment shown in FIG. 1, brake band assembly 10 includes a brake band 14 which surrounds and/or encircles a brake drum (not shown). Further in this non-limiting embodiment, brake band assembly 10 includes a housing portion 16 which surrounds at least a portion of the brake drum, a strut assembly 18 which is attached connected and/or coupled to housing portion 16, and a pin 20 which is also attached connected and/or coupled to housing portion 16.

Figure 4:
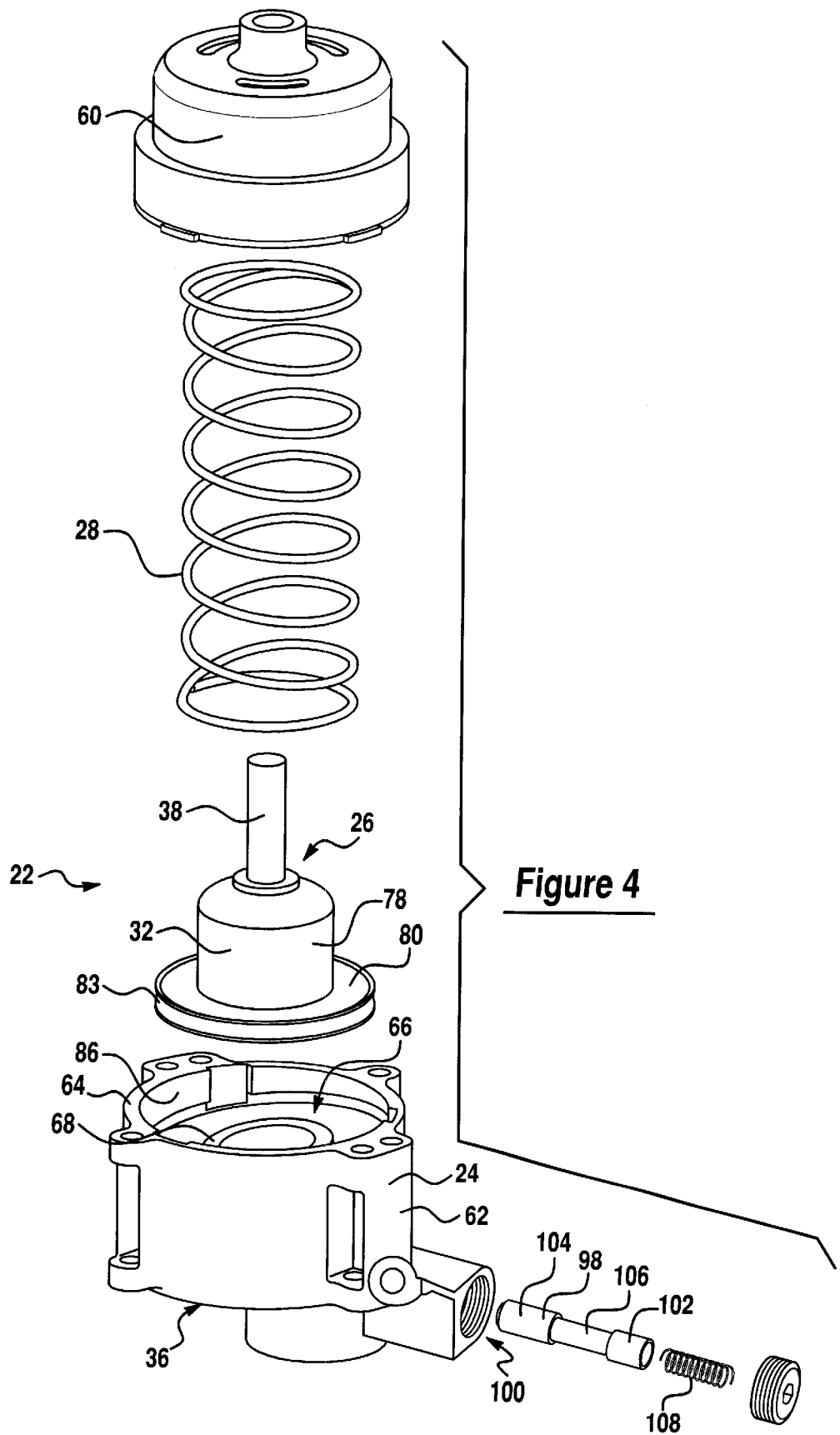
FIG. 4 illustrates an exploded view of the servo assembly of FIG. 1.

A servo assembly 22 is also shown in the non-limiting embodiment of FIG. 1 and an exploded view of servo assembly 22 is shown in FIG. 4. Servo assembly 22 is comprised of a housing portion 24 which surrounds a piston 26 and a spring 28. In this non-limiting embodiment, spring 28 engages an upper portion 30 of housing portion 24 and a sealing portion 32 of piston 26 thereby providing a continuous force which urges and/or biases piston 26 away from strut assembly 18 and upper portion 30.

When a gear shift of a vehicle having brake band assembly 10 is desired, pressurized hydraulic fluid (i.e., oil) is introduced into housing portion 24 of servo assembly 22 in order to force piston 26 into contact and/or forcible engagement with strut assembly 18 such that assembly 18 engages brake band 14 which engages the brake drum (not shown). Specifically, in one non-limiting embodiment of the present invention, the pressurized hydraulic fluid is forced into housing portion 24 between sealing portion 32 of piston 26 and a bottom portion 36 of housing portion 24 effective to move piston 26 against the force of spring 28 and to move a rod portion 38 of piston 26 into engagement with strut assembly 18. In this manner, rod portion 38 engages and/or contacts a lever 40 of strut assembly 18 and thereby forces a strut 42 which is part of strut assembly 18 and which is attached, connected and/or coupled to lever 40, into engagement with an apply anchor 44 of band 14. When strut 42 engages apply anchor 44, band 14 is tightened upon the brake drum such that a gear shift may be effected in the vehicle. It should be noted that, in this particular non-limiting embodiment, band 14 also includes an engagement anchor 46 which prohibits band 14 from rotating when it engages the brake drum, thereby allowing band 14 to more effectively engage the brake drum.

Referring now to FIGS. 1–5, the servo assembly 22 is illustrated. The housing portion 24 of the servo assembly 22 includes an upper portion 60 and a lower portion 62. Lower portion 62 of housing 24 includes an outer wall 64 which is substantially cylindrical and which is integrally formed with bottom portion 36 of lower portion 62. Together, bottom portion 36 and outer wall 64 of lower portion 62 substantially form a "cup" shape having an open cylindrical interior area 66.

Lower portion 62 also includes an interior member 68 which extends into interior area 66 and divides interior area 66 into a first and/or small area 70 and a second and/or large area 72. In the non-limiting embodiment shown, both the outer wall 64 and the interior member 68 are generally cylindrical such that large area 72 is generally cylindrical and encircles small area 70 which is also generally cylindrical.

This arrangement of the outer wall 64 and the interior member 68 is effective to allow the sealing portion 32 of the piston 26 to be securely received by the lower portion 62 of housing portion 24. More specifically, in the non-limiting embodiment shown, sealing portion 32 is "bell shaped" having a central or "cup shaped" portion 78 which is integrally connected to, attached to, and/or formed with a flange portion 80 which extends radially from said central portion 78. As best seen in FIG. 1, central portion 78 is fitted around interior member 68 thereby at least partially enclosing first and/or small area 70 from second an/or large area 72. Furthermore, in the non-limiting embodiment shown, interior member 68 is fitted with a seal 82 that frictionally engages central portion 78 and thereby assists and/or aids in sealing and/or closing off first and/or small area 70 from second and/or large area 72.

Once central portion 78 is fitted upon interior member 68, flange portion 80 is thereby placed and/or fitted in second and/or large area 72. Flange portion 80 includes a seal 83 which is attached connected and/or coupled to the outer periphery of flange portion 80. Seal 83 frictionally engages and/or seals against an inner surface 86 of outer wall 64.

Figure 2:
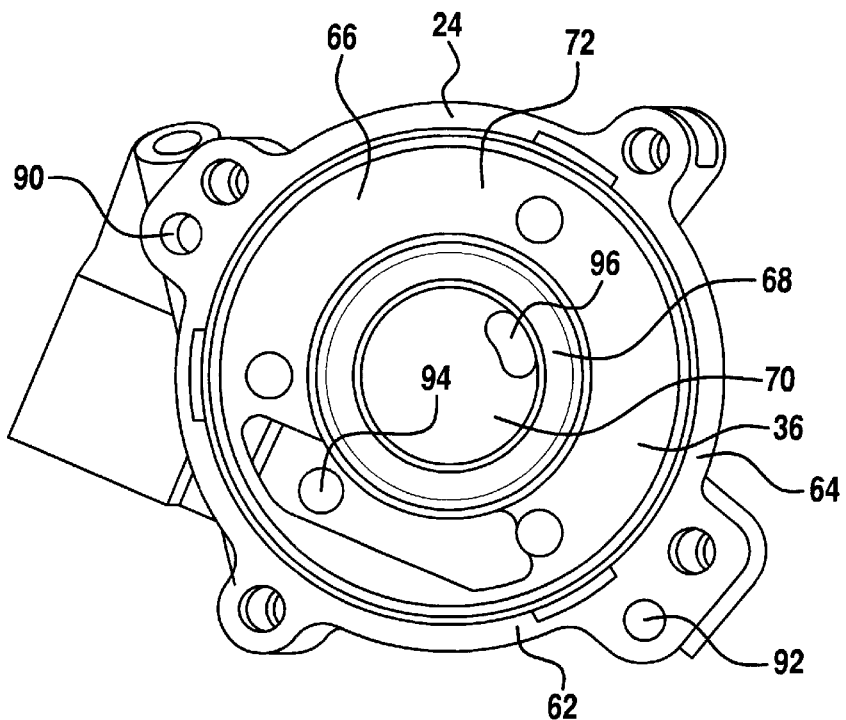
FIG. 2 illustrates a top view of a lower portion of a housing which is part of the servo assembly shown in FIG. 1.
Figure 3:
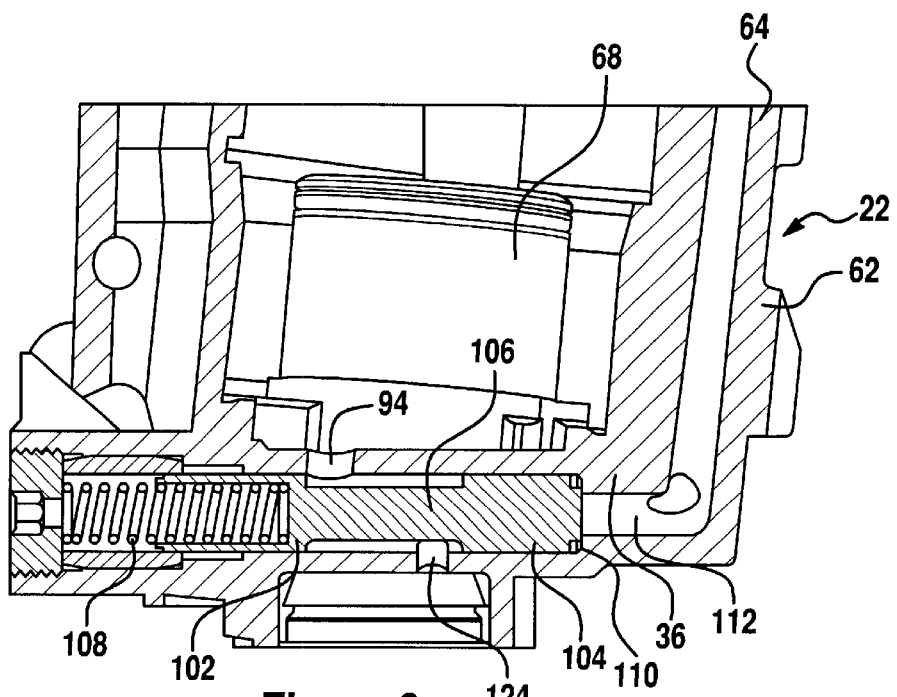
FIG. 3 illustrates a side sectional view of the portion of the housing shown in FIG. 2.
Figure 5:
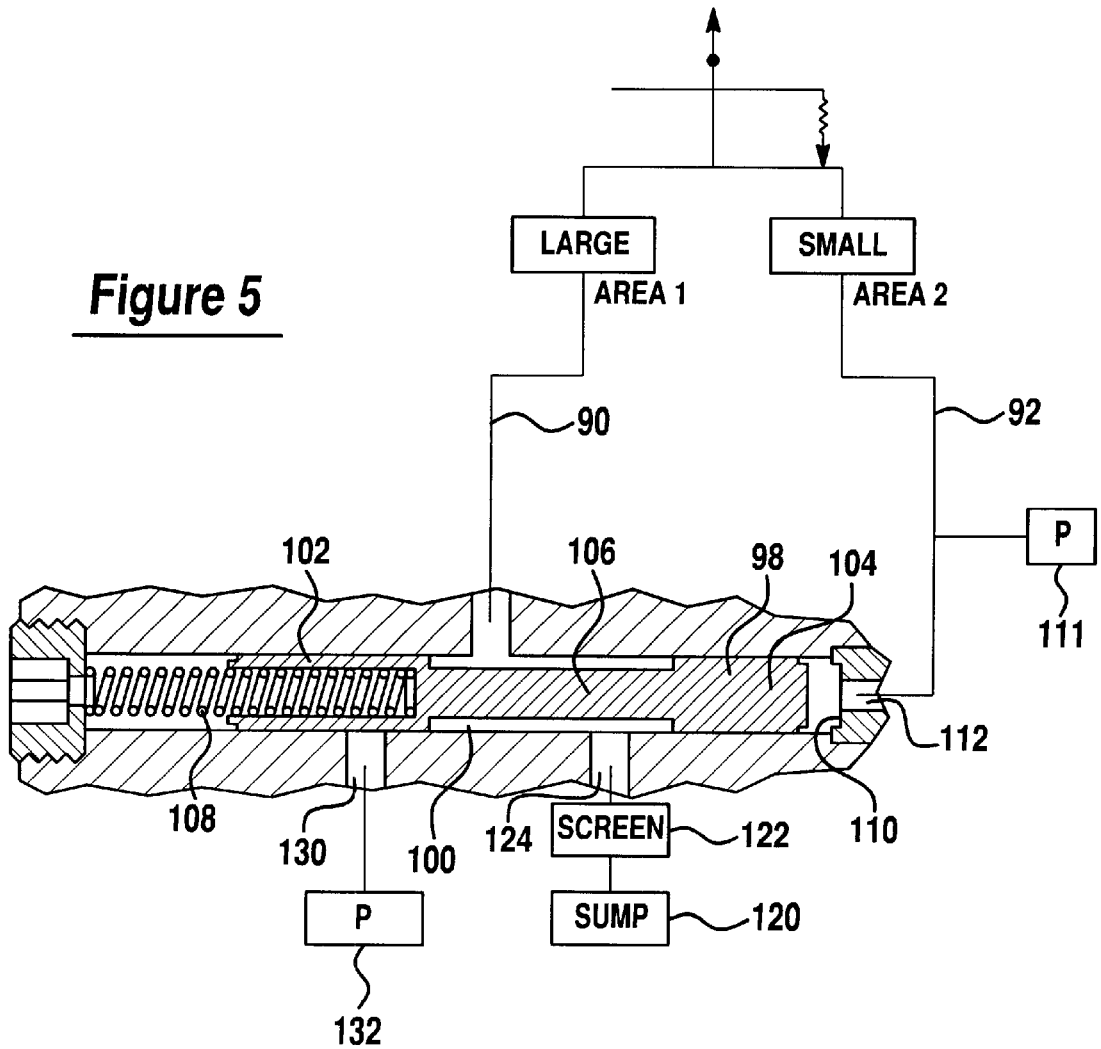
FIG. 5 illustrates a partial schematic view of the servo assembly of FIG. 1.

As best shown in FIGS. 1, 2, and 5, lower portion 62 of housing 24 has two ports 90, 92 which independently provide two sources of hydraulic fluid. Particularly, as shown in FIG. 2, there are two openings and/or apertures 94, 96, which provide access to the interior area 66 of the lower portion 24 of the housing 26. Specifically, opening 96 provides access for a first supply 111 of hydraulic fluid which is supplied through port 92 to first and/or small area 70. Furthermore, opening 94 provides access for a second supply of hydraulic fluid through port 90 to second and/or large area 72.

Access to opening 94 through port 90 is selectively controlled and/or manipulated by a rod, dowel, and/or spool 98 which resides in a cylindrical hole and/or opening 100. Spool 98 includes two outer wide portions 102, 104 and a middle thin portion 106. A spring 108 is also disposed in hole 100 and spring 108 tends to push and/or bias spool 98 toward an end and/or surface 110 of hole 100.

In operation, and as best seen in the non-limiting embodiment shown in FIG. 4, hydraulic fluid is supplied from the first supply to the small area and/or first area 70 through port 92, and the first supply 111 also supplies hydraulic oil at the same pressure toward wide portion 104 of rod, dowel and/or spool 100 through an opening 112.

As pressurized hydraulic fluid is supplied by first supply 111 to the first or small area 70 through opening 96, pressurized hydraulic fluid is also supplied to hole 100 through opening 112 such that spool 98 is biased and/or moved away from surface 110. Concurrently, piston 26 is moved toward strut assembly 14 due to the pressure supplied by the first supply 111 to first area 70 and concomitantly, flange portion 80 is moved away from bottom portion 36 of housing 24, thus creating a partial vacuum in a portion of the second or large area 72 between bottom portion 36 and flange portion 80. The vacuum tends to pull hydraulic fluid, such fluid typically not being pressurized, from a sump 120 and through a screen 122 and a hole and/or aperture 124 into second and/or large area 72 through aperture 94. In this manner, the portion of large area 72 between bottom portion 36 and flange portion 80 fills with hydraulic fluid without that particular hydraulic fluid applying pressure to flange portion 80. Then, as pressure from the first supply becomes greater, spool 102 move against the force of spring 108 and away from surface 110 until hole 124 is covered and/or closed by thick portion 104 of spool 102 and a hole 130 which is part of port 90 is uncovered and/or opened to thin portion 106.

Hole 130 provides access to a second pressurized supply 132 of hydraulic fluid from port 90 which provides second or large area 72 with pressurized hydraulic fluid from second supply 132 through aperture 94. In this manner, second supply 132 of fluid places forces upon flange portion 80 of piston 26. It should be noted that, by providing first and second supply 111, 132, the pressure of second supply 132 can be controlled independently from the pressure of the first supply 111. Furthermore, the forces which are applied to flange portion 80 by supply 132 are applied almost instantaneously because the portion of second and/or large area 72 which is between flange portion 80 and bottom portion 36 is already filled with fluid from the sump 120 as explained previously. Therefore, second supply 132 does not have to completely fill the second and/or large area 72 before it can place pressure against flange portion 80. Rather, the pressure from the second supply 132 is almost instantaneously transferred and/or translated to the flange portion 80 of the piston 26 through the fluid that was supplied to the large area 72 by sump 120.

It will be recognized that by providing second supply 132 of hydraulic fluid which is independent from first supply 111, a wide variety of forces may be applied to engage the piston 26 with brake band 14. For example, and without limitation, the first supply can supply hydraulic fluid at a first pressure when a shift of vehicle gears into a lower gear is desired, and second supply 132 can supply hydraulic fluid at a second pressure which is the same or different from the first pressure when a shift of the vehicle's gears into reverse is desired. In this manner different forces can be supplied for different gear shifts to allow smoother vehicle gear shifts.

It will be further recognized that first and second supply 111, 132 can originate from the same pool and/or source of hydraulic fluid, however, the pressure of the first and second supply 111, 132 are independently controlled. Independent control in this manner provides greater ability to calibrate first and second supply 111, 132 pressures and allow a greater margin of error for the pressures at which first and second supply 111, 132 may be maintained.

It should be understood that this invention is not to be limited to the exact construction or embodiment described above but that various changes may be made without departing from the spirit or scope of the invention.

What is claimed is:

1. A servo assembly for engaging a brake band in a vehicle having an automatic transmission, said servo assembly comprising:
    a piston which selectively engages said brake band, said piston including a first portion and a second portion;
    a housing having an interior area, said housing at least partially surrounding said piston;
    an interior member which extends from said housing into said interior area of said housing thereby separating said interior area into a first area and a second area;
    a first pressurized supply which supplies a first amount of hydraulic fluid through a first opening in said housing to said first area wherein said first amount of fluid applies pressure to said first portion of said piston;
    a second pressurized supply which is separate from said first supply, which supplies a second amount of hydraulic fluid through a second opening in said housing to said second area wherein said second amount of fluid applies pressure to said second portion of said piston; and
    a spool which prevents said first amount of hydraulic fluid from entering said second portion of said piston.

2. A servo assembly as in claim 1 wherein said piston further includes a rod portion and said first and second portion of said piston are part of a sealing portion of said piston.

3. A servo assembly as in claim 2 wherein said first portion is a central portion of said piston which is fitted over said interior member and said second portion is a flange portion which extends radially from said central portion.

4. A servo assembly as in claim 3 further comprising a spring, wherein said housing includes an upper portion and wherein said spring contacts said upper portion of said housing and said flange portion of said piston thereby urging said piston away from said upper portion.

5. A servo assembly as in claim 1 wherein said spool is movable to first allow said first amount of hydraulic fluid to flow into said first area and then to allow said second amount of hydraulic fluid to flow into said second area.

6. A servo assembly as in claim 5 wherein said spool includes two thick portions and a thin portion which is disposed between said two thick portions, wherein said first supply selectively applies pressure to one of said two thick portions thereby allowing said second supply to force said second amount of hydraulic fluid into said second area.

7. A servo assembly as in claim 6 wherein said second area is selectively interconnected to a sump which selectively supplies hydraulic fluid to said second area.

8. A servo assembly as in claim 7 wherein said sump supplies said hydraulic fluid prior to said second supply supplying said second amount.

9. A servo assembly for selectively actuating a piston which engages a brake band, said servo assembly comprising:
    a first pressurized supply of hydraulic fluid which supplies a first amount of hydraulic fluid to a first portion of said piston thereby applying a first pressure against said first portion; and
    a second pressurized supply of hydraulic fluid which supplies a second amount of hydraulic fluid to a second portion of said piston thereby applying a second pressure against said second portion;
    wherein said first portion only receives pressure from said first supply and said second portion only receives pressure from said second supply and said first pressure is controlled separately from said second pressure.

10. A servo assembly as in claim 9 wherein said piston further includes a rod portion and said first and second portion of said piston are part of a sealing portion of said piston.

11. A servo assembly as in claim 10 wherein said first portion is smaller than said second portion.

12. A servo assembly as in claim 11 further comprising a spring, wherein said spring urges said piston against said first and second pressures.

13. A servo assembly as in claim 9 further comprising a spool which selectively allows said first amount of hydraulic fluid and said second amount of hydraulic fluid to apply said first and said second pressures respectively.

14. A servo assembly as in claim 13 wherein said spool includes two thick portions and a thin portion between said two thick portions, wherein said first supply selectively applies pressure to one of said two thick portions thereby allowing said second supply to apply said second pressure.

15. A servo assembly as in claim 14 wherein said second supply supplies said second amount to a second area, and wherein said second area is selectively interconnected to a sump which selectively supplies hydraulic fluid to said second area.

16. A servo assembly as in claim 15 wherein said sump supplies said hydraulic fluid prior to said second supply supplying said second amount.

17. A method for actuating a piston within a servo assembly, said method comprising:
    providing a first pressurized supply of hydraulic fluid which selectively places a first pressure upon a first portion of said piston;
    providing a second pressurized supply of hydraulic fluid which selectively places a second pressure upon a second portion of said piston; and
    providing a spool which prevents said first supply of hydraulic fluid from entering said second portion of said piston and wherein said first portion only receives pressure from said first supply and said second portion only receives pressure from said second supply.

18. A method as in claim 17 wherein said piston selectively engages a brake band in an automatic transmission vehicle.

19. A method as in claim 17 wherein said first pressure and said second pressure are independently controlled.

20. A method as in claim 17 further comprising:
    providing hydraulic fluid from a sump, said hydraulic fluid from said sump permitting said second supply of hydraulic fluid to apply said second pressure to said second portion relatively quickly.

\* \* \* \* \*